(12) United States Patent
Pu et al.

(10) Patent No.: US 11,126,828 B2
(45) Date of Patent: Sep. 21, 2021

(54) METHOD AND DEVICE FOR RECOGNIZING IDENTITY OF HUMAN TARGET

(71) Applicant: HANGZHOU HIKVISION DIGITAL TECHNOLOGY CO., LTD., Hangzhou (CN)

(72) Inventors: Shiliang Pu, Hangzhou (CN); Lin Shen, Hangzhou (CN); Linjie Shen, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/643,221

(22) PCT Filed: Aug. 22, 2018

(86) PCT No.: PCT/CN2018/101665
§ 371 (c)(1),
(2) Date: Feb. 28, 2020

(87) PCT Pub. No.: WO2019/042195
PCT Pub. Date: Mar. 7, 2019

(65) Prior Publication Data
US 2020/0193146 A1 Jun. 18, 2020

(30) Foreign Application Priority Data
Aug. 31, 2017 (CN) .......................... 201710769677.5

(51) Int. Cl.
*G06K 9/00* (2006.01)

(52) U.S. Cl.
CPC ..... *G06K 9/00288* (2013.01); *G06K 9/00268* (2013.01); *G06K 9/00771* (2013.01)

(58) Field of Classification Search
CPC ........... G06K 9/00288; G06K 9/00268; G06K 9/00771
See application file for complete search history.

(56) References Cited

U.S. PATENT DOCUMENTS

2006/0062431 A1* 3/2006 Low .................. G01S 3/7864
382/103
2011/0188713 A1* 8/2011 Chin ..................... G06F 16/583
382/118

(Continued)

FOREIGN PATENT DOCUMENTS

CN    101021870    8/2007
CN    103942563    7/2014

(Continued)

OTHER PUBLICATIONS

International Search Report and Written Opinion issued in corresponding application No. PCT/CN2018/101665, dated Dec. 11, 2018 (English translation of International Search Report provided).

(Continued)

*Primary Examiner* — Md K Talukder
(74) *Attorney, Agent, or Firm* — Norton Rose Fulbright US LLP

(57) ABSTRACT

The embodiments of the present application provide a method and apparatus for recognizing an identity of a human target. The method includes: obtaining a to-be-recognized image; extracting a target feature of a to-be-recognized human target in the to-be-recognized image as a to-be-searched target feature; searching for a facial information item corresponding to the to-be-searched target feature based on a pre-established correspondence between target features and facial information items; and determining an identity of the to-be-recognized human target based on the found facial information item. It can be seen that, in this solution, there is no need to extract the facial features in the (Continued)

image, and even if the facial region is not clear or is shaded by other objects in the image, the accuracy of identity recognition is reduced. Therefore, accuracy of identity recognition is improved.

14 Claims, 2 Drawing Sheets

(56) References Cited

U.S. PATENT DOCUMENTS

| | | | | |
|---|---|---|---|---|
| 2015/0023596 A1* | 1/2015 | Oami | ............ | G06K 9/3241 |
| | | | | 382/173 |
| 2015/0235596 A1* | 8/2015 | Lu | ............ | G09G 3/34 |
| | | | | 345/207 |
| 2018/0341803 A1* | 11/2018 | Matsushita | ........ | G06K 9/00744 |
| 2020/0193146 A1* | 6/2020 | Pu | ............ | G06K 9/00268 |
| 2021/0065706 A1* | 3/2021 | Hu | ............ | G06K 9/00288 |

FOREIGN PATENT DOCUMENTS

| | | |
|---|---|---|
| CN | 104463148 | 3/2015 |
| CN | 104850828 | 8/2015 |
| CN | 105160295 | 12/2015 |
| CN | 105447466 | 3/2016 |
| CN | 105808709 | 7/2016 |
| CN | 106295504 | 1/2017 |
| CN | 106446816 | 2/2017 |
| CN | 106778474 | 5/2017 |
| CN | 106845385 | 6/2017 |
| CN | 106991395 | 7/2017 |
| WO | WO 2016139870 | 9/2016 |

OTHER PUBLICATIONS

Wei, Sun. *Research and Implementation of Search and Track Algorithm Based on People Attributes*. 2013. Nanjing University of Posts and Telecommunications, Master Thesis (English translation of abstract provided).

Extended European Search Report issued in Corresponding European Application No. 18851366.7, dated Jul. 1, 2020.

Office Action issued in Corresponding Chinese Application No. 201710769677.5, dated Aug. 13, 2020 (English Translation provided).

Office Action issued in corresponding Chinese Application No. 201710769677.5, dated Mar. 18, 2020 (English Translation Provided).

* cited by examiner

METHOD AND DEVICE FOR RECOGNIZING IDENTITY OF HUMAN TARGET

CROSS-REFERENCE TO RELATED APPLICATIONS

The present application is a national phase under 35 U.S.C. § 371 of International Application No. PCT/CN2018/101665, filed Aug. 22, 2018, which claims priority to Chinese Patent Application No. 201710769677.5, filed with the China National Intellectual Property Administration, on Aug. 31, 2017 and entitled "Method and Device for Recognizing Identity of Human Target", each of which are incorporated herein by reference in their entirety.

TECHNICAL FIELD

The present application relates to the technology field of image processing, and in particular, to a method and apparatus for recognizing an identity of a human target.

BACKGROUND

In a video surveillance, it is usually necessary to recognize the identity of a human target appearing in a surveillance image. An existing recognition scheme generally includes: determining a facial region in an image, performing feature extraction on the facial region, and recognizing the identity of the human target in the image based on the extracted facial features.

In the above solution, if the facial region is not clear or is shielded by other objects in the image, the determined identity is not accurate.

SUMMARY

The objective of embodiments of the present application is to provide a method and apparatus for recognizing an identity of a human target to improve the accuracy of identity recognition.

In order to achieve the above objective, an embodiment of the present application provides a method for recognizing an identity of a human target, including: obtaining a to-be-recognized image; extracting a target feature of a to-be-recognized human target in the to-be-recognized image as a to-be-searched target feature; searching for a facial information item corresponding to the to-be-searched target feature based on a pre-established correspondence between target features and facial information items; wherein, in the correspondence, a pair of a target feature and a corresponding facial information item belongs to a same human target; and determining an identity of the to-be-recognized human target based on the found facial information item.

Optionally, obtaining a to-be-recognized image may include: receiving a to-be-recognized image input by a user; or, obtaining a to-be-recognized image from a designated acquisition device.

Optionally, searching for a facial information item corresponding to the to-be-searched target feature based on a pre-established correspondence between target features and facial information items may include: searching for a facial feature corresponding to the to-be-searched target feature based on a pre-established correspondence between target features and facial features. Determining an identity of the to-be-recognized human target based on the found facial information item may include: determining the identity of the to-be-recognized human target based on the found facial feature.

Optionally, searching for a facial information item corresponding to the to-be-searched target feature based on a pre-established correspondence between target features and facial information items includes: searching for a facial image corresponding to the to-be-searched target feature based on a pre-established correspondence between target features and facial images. Determining an identity of the to-be-recognized human target based on the found facial information item includes: determining the identity of the to-be-recognized human target based on the found facial image.

Optionally, extracting a target feature of a to-be-recognized human target in the to-be-recognized image as a to-be-searched target feature may include: extracting an original target feature of the to-be-recognized human target in the to-be-recognized image, and calculating a hash value of the original target feature as a to-be-searched hash value. Searching for a facial information item corresponding to the to-be-searched target feature based on a pre-established correspondence between target features and facial information items may include: searching for a facial information item corresponding to the to-be-searched hash value based on a pre-established correspondence between hash values and facial information items.

Optionally, searching for a facial information item corresponding to the to-be-searched hash value based on a pre-established correspondence between hash values and facial information items may include: calculating a similarity between each of the hash values included in the pre-established correspondence between hash values and facial information items and the to-be-searched hash value, respectively; and determining a facial information item corresponding to a hash value whose similarity with the to-be-searched hash value meets a preset condition.

Optionally, after obtaining a to-be-recognized image, the method may further include: determining an acquisition attribute of the to-be-recognized image as a to-be-searched acquisition attribute; wherein, the acquisition attribute includes a moment and/or a location at which the to-be-recognized image is acquired. Searching for a facial information item corresponding to the to-be-searched target feature based on a pre-established correspondence between target features and facial information items may include: searching, in the pre-established correspondence between target features and facial information items, for a target acquisition attribute whose difference from the to-be-searched acquisition attribute is less than a preset threshold; and searching, in facial information items corresponding to the target acquisition attribute, for a facial information item corresponding to the to-be-searched target feature.

Optionally, after obtaining a to-be-recognized image, and before determining an identity of the to-be-recognized human target based on the found facial information item, the method may further include: determining whether there is a facial region that meets a definition requirement in the to-be-recognized image; if there is a facial region that meets the definition requirement, extracting the facial information item from the to-be-recognized image; if there is no facial region that meets the definition requirement, performing the step of extracting a target feature of a to-be-recognized human target in the to-be-recognized image as a to-be-searched target feature.

In order to achieve the above objective, an embodiment of the present application further provides an apparatus for recognizing an identity of a human target. The apparatus includes: an obtaining module configured for obtaining a to-be-recognized image; a first extraction module configured for extracting a target feature of a to-be-recognized human target in the to-be-recognized image as a to-be-searched target feature; a search module configured for searching for a facial information item corresponding to the to-be-searched target feature based on a pre-established correspondence between target features and facial information items; wherein, in the correspondence, a pair of a target feature and a corresponding facial information item belongs to a same human target; and a first determination module configured for determining an identity of the to-be-recognized human target based on the found facial information item.

Optionally, the obtaining module is further configured for receiving a to-be-recognized image input by a user; or, obtaining a to-be-recognized image from a designated acquisition device.

Optionally, the search module is further configured for searching for a facial feature corresponding to the to-be-searched target feature based on a pre-established correspondence between target features and facial features; and the first determination module is further configured for: determining the identity of the to-be-recognized human target based on the found facial feature.

Optionally, the search module is further configured for: searching for a facial image corresponding to the to-be-searched target feature based on a pre-established correspondence between target features and facial images; and the first determination module is further configured for: determining the identity of the to-be-recognized human target based on the found facial image.

Optionally, the first extraction module is further configured for extracting an original target feature of the to-be-recognized human target in the to-be-recognized image, and calculating a hash value of the original target feature as a to-be-searched hash value; and the search module is further configured for: searching for a facial information item corresponding to the to-be-searched hash value based on a pre-established correspondence between hash values and facial information items.

Optionally, the search module may be specifically configured for: calculating a similarity between each of the hash values included in the pre-established correspondence between hash values and facial information items and the to-be-searched hash value, respectively; and determining a facial information item corresponding to a hash value whose similarity with the to-be-searched hash value meets a preset condition.

Optionally, the apparatus may further include: a second determination module configured for determining an acquisition attribute of the to-be-recognized image as a to-be-searched acquisition attribute; wherein, the acquisition attribute includes a moment and/or a location at which the to-be-recognized image is acquired. The search module is further configured for: searching, in the pre-established correspondence between target features and facial information items, for a target acquisition attribute whose difference from the to-be-searched acquisition attribute is less than a preset threshold; and searching, in facial information items corresponding to the target acquisition attribute, for a facial information item corresponding to the to-be-searched target feature.

Optionally, the apparatus may further include: a decision module, configured for: determining whether there is a facial region that meets a definition requirement in the to-be-recognized image; if there is a facial region that meets the definition requirement, triggering a second extraction module; if there is no facial region that meets the definition requirement, triggering the first extraction module; wherein, the second extraction module is configured for extracting a facial information item in the to-be-recognized image.

In order to achieve the above objective, an embodiment of the present application provides an electronic device, including a processor, a communication interface, a memory and a communication bus; wherein, the processor, the communication interface and the memory communicate with each other via the communication bus; the memory is configured for storing a computer program; the processor is configured for executing the computer program stored in the memory so as to perform any of the methods for recognizing an identity of a human target described above.

In order to achieve the above objective, an embodiment of the present application further provides a computer readable storage medium. The computer readable storage medium stores a computer program therein. The computer program, when executed by a processor, performs any of the methods for recognizing an identity of a human target described above.

In order to achieve the above objective, an embodiment of the present application further provides an executable program code which, when executed, performs any of the methods for recognizing an identity of a human target described above.

In the embodiment of the present application, a target feature of a to-be-recognized human target in the image is extracted as a to-be-searched target feature, a facial information item corresponding to the to-be-searched target feature is searched for based on a pre-established correspondence between target features and facial information items, and an identity of the to-be-recognized human target is determined based on the facial information as found. It can be seen that in this solution, there is no need to extract facial features in the image. Even if the facial region is not clear or is shaded by other objects in the image, the accuracy of identity identification will not be reduced. Therefore, the application of this solution improves the accuracy of recognizing the identity.

Of course, any one of the products or methods implementing the present application is not necessarily required to achieve all of the advantages described above at the same time.

BRIEF DESCRIPTION OF THE DRAWINGS

In order to more clearly describe the technical solutions of the embodiments of the present application and of the prior art, accompanying drawings that need to be used in embodiments and in the prior art will be briefly described below. Obviously, accompanying drawings described below are for only some of embodiments of the present application; those skilled in the art may also obtain other accompanying drawings based on these accompanying drawings without any creative efforts.

DETAILED DESCRIPTION

The technical solutions of the embodiments of the present application will be described clearly and completely in combination of the accompanying drawings of the embodiments of the present application. It is apparent that the described embodiments are only a part of the embodiments of the present application, and not all of them. All other embodiments obtained by a person of ordinary skill in the art based on the embodiments of the present application without any creative effort fall within the protection scope of the present application.

In order to solve the above-mentioned technical problem, embodiments of the present application provide a method and apparatus for recognizing an identity of a human target. The method and apparatus may, by way of example but not limitation, be applied to a device capable of image processing.

The method for recognizing an identity of a human target provided by an embodiment of the present application is described in detail below.

Figure 1:
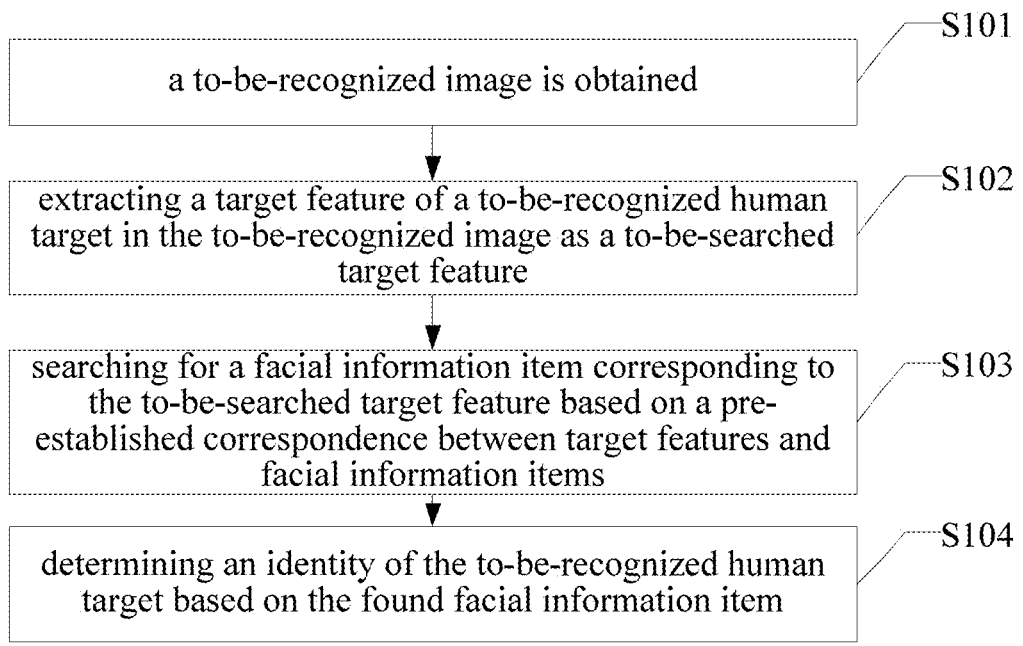
FIG. 1 is a schematic flowchart of a method for recognizing an identity of a human target provided by an embodiment of the present application.

FIG. 1 is a schematic flowchart of a method for recognizing an identity of a human target provided by an embodiment of the present application. The method includes steps of S101-S104.

At S101, a to-be-recognized image is obtained.

At S102, a target feature of a to-be-recognized human target in the to-be-recognized image is extracted as a to-be-searched target feature.

At S103, a facial information item corresponding to the to-be-searched target feature is searched for based on a pre-established correspondence between target features and facial information items. Wherein, a pair of target feature and a corresponding facial information item in the correspondences belongs to a same human target.

At S104, an identity of the to-be-recognized human target is determined based on the found facial information item.

In the embodiment shown in FIG. 1 of the present application, a target feature of a to-be-recognized human target in the image is extracted as a to-be-searched target feature, a facial information item corresponding to the to-be-searched target feature is searched for based on a pre-established correspondence between target features and facial information items, and an identity of the to-be-recognized human target is determined based on the facial information as found. It can be seen that in this solution, there is no need to extract facial features in the image. Even if the facial region is not clear or is shaded by other objects in the image, the accuracy of identity identification will not be reduced. Therefore, the application of this solution improves the accuracy of recognizing the identity.

The embodiment shown in FIG. 1 is described in detail below.

At S101, a to-be-recognized image is obtained.

In an implementation, S101 may include receiving a to-be-recognized image input by a user. In an alternative implementation, S101 may include obtaining the to-be-recognized image from a designated acquisition device.

It can be understood that when an identity of a human target needs to be recognized, a user may input an image including the human target, or otherwise, the user may identify the acquisition device that acquires the human target, and then obtain an image including the human target from the acquisition device.

Alternatively, the to-be-recognized image may also be obtained by using other methods. Embodiments are limited in this aspect.

At S102, a target feature of a to-be-recognized human target in the to-be-recognized image is extracted as a to-be-searched target feature.

Target features of the human target may include color, texture, size, wearing features such as with or without a bag, garment styles, and physical features such as a height and body shape of a human target, and other features. Embodiments are not limited in this aspect.

There are many ways to extract a target feature in an image. For example, a region for a human target in the image is detected by using an edge detection algorithm and then the image feature of the region is extracted. Alternatively, the target feature of the human target in the image is extracted by using a pre-trained neural network. Embodiments are limited in this aspect.

At S103, a facial information item corresponding to the to-be-searched target feature is searched for based on a pre-established correspondence between target features and facial information items. In the correspondence, a pair of a target feature and a corresponding facial information item belongs to a same human target.

There are many ways to establish the correspondence, several specific examples of which are introduced below.

In a first manner, an image acquired by an acquisition device is obtained. A target feature of a human target in the image, and a facial feature of a facial region that meets a definition requirement in the image are extracted. A correspondence between the target feature and facial information item can then be established. The target feature and the facial information item are associated with the same human target. Facial information may include facial features. Alternatively, facial information may include both facial features and images.

It can be understood that if an image acquired by the acquisition device includes both a clear human body region and a clear facial region that are directed to the same human target, a target feature and a facial feature of the same human target may be obtained from the image. The facial feature may be stored as a facial information item in correspondence with the target feature. Alternatively, the image and the facial feature may be stored as a facial information item in correspondence with the target feature.

For example, one or more acquisition devices may communicate with a server, and send acquired images to the server. The server extracts target features and facial features of the same human target in the images, and stores the target features and the facial features in a local database of the server or in a database connected to the server.

Alternatively, the server may also store the target features, the facial features together with the images in a local database of the server or in a database connected to the server. The device on which method steps according to the embodiment of the present application are executed may be integrated with the server or separated therefrom.

Figure 2:
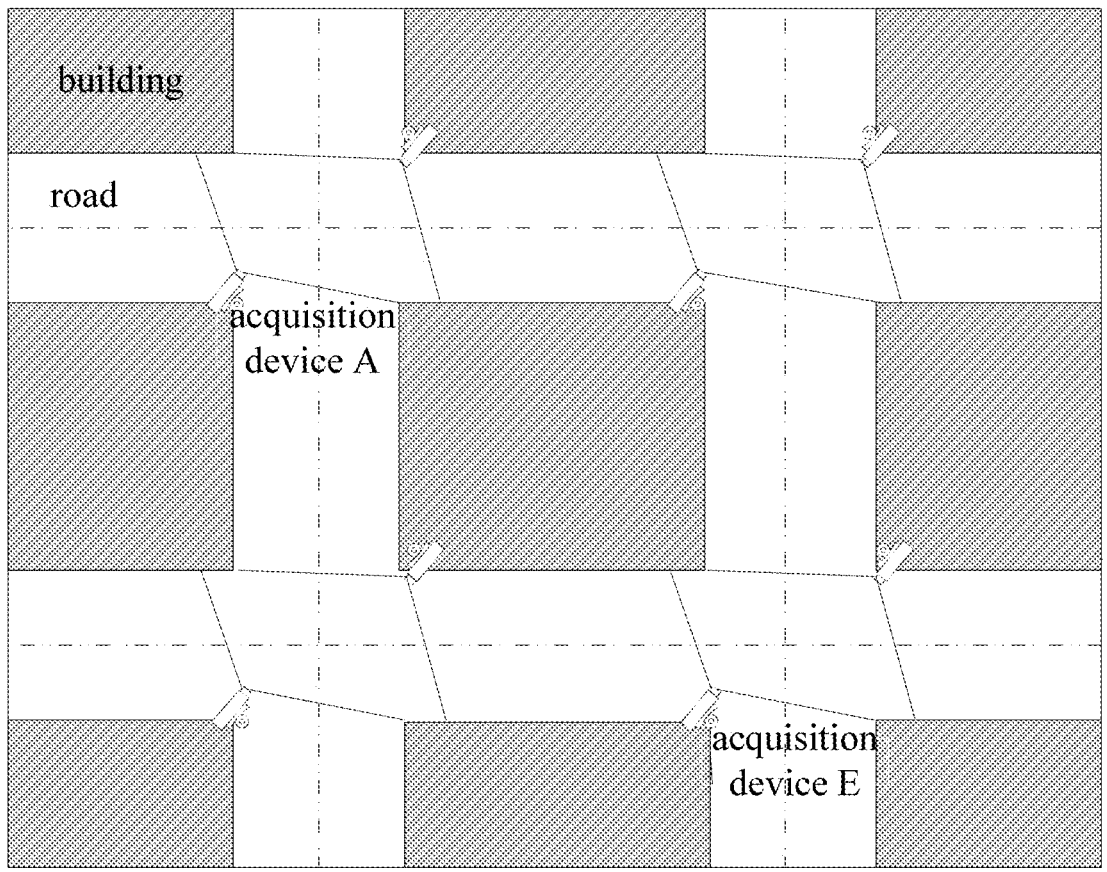
FIG. 2 is a schematic diagram of an application scenarios provided by an embodiment of the present application.

For example, FIG. 2 illustrates a scenario in which multiple acquisition devices communicate with the same server. The images acquired by these acquisition devices are clear, such that the server may extract and store target features and facial features in the images.

If the correspondence is established in the first manner, the operation of S103 may include: searching for a facial feature corresponding to the to-be-searched target feature based on a pre-established correspondence between target features and facial features. Alternatively, S103 may include: searching for a facial feature and an image corresponding to the to-be-searched target feature based on pre-established correspondences between target features, facial features and images; wherein, the image includes a facial region that meets the definition requirement.

In a second manner, an image acquired by an acquisition device is obtained, and the image includes a facial region that meets the definition requirement. A target feature of a human target in the image is extracted. A correspondence between the target feature and facial information is established, wherein, the facial information item includes the image.

The second manner is different from the first manner in that, facial information does not include facial features, but only images including the facial region. It can be understood that an image including a facial region may also be used as facial information for identity recognition.

If the correspondence is established in the second manner, the operation of S103 may include: searching for an image corresponding to the to-be-searched target feature based on a pre-established correspondence between target features and facial images. The image includes a facial region that meets the definition requirement.

In a third manner, a facial image and a human target image of the same human target are obtained; a facial feature of the same human target in the facial image is extracted, and a target feature of the same human target in the human target image is extracted. A correspondence between the target feature of the human target and facial information item is established; wherein, the facial information item includes the facial feature, or the facial information item includes the facial feature and the facial image.

In the first manner and the second manner described above, a target feature and a facial feature of the same human target may be extracted from a single image, while in the third manner and the fourth manner below, a target feature and a facial feature of the same human target may be extracted from different images.

If the correspondence is established in the third manner, the operation of S103 may include: searching for a facial feature corresponding to the to-be-searched target feature based on a pre-established correspondence between target features and facial features. Alternatively, S103 may include: searching for a facial feature and a facial image corresponding to the to-be-searched target feature based on a pre-established correspondence between target features, and facial features and facial images.

In a fourth manner, a facial image and a human target image of the same human target are obtained. A target feature of the same human target in the human target image is extracted. A correspondence between the target feature of the human target and facial information item is established; wherein, the facial information includes the facial image.

The fourth manner is different from the third manner in that the facial information includes a facial feature in the third manner, while the facial information does not include the facial feature, but only an image including the facial region in the fourth manner. It can be understood that the image including the facial region may also be used as the facial information for recognizing the identity.

If the correspondence is established in the fourth manner, the operation of S103 may include: searching for a facial image corresponding to the to-be-searched target feature based on pre-established correspondences between the target features and facial images.

In one implementation, the target feature of the human target may be represented by a hash value. In this implementation, the target feature extracted in S102 is a hash value, and the target features in the pre-established correspondence are also hash values.

Specifically, the operation of S103 may include: extracting an original target feature of the to-be-recognized human target in the to-be-recognized image, and calculating a hash value of the original target feature as a to-be-searched hash value.

The operation of S104 may include: searching for a facial information item corresponding to the to-be-searched hash value based on a pre-established correspondence between hash values and facial information items.

In this embodiment, a target feature is represented by a hash value. This may improve search efficiency.

In this embodiment, searching for a facial information item corresponding to the to-be-searched hash value based on a pre-established correspondence between hash values and facial information items may include:

calculating a similarity between each of the hash values included in the pre-established correspondence between hash values and facial information items and the to-be-searched hash value respectively; and determining a facial information item corresponding to a hash value whose similarity with the to-be-searched hash value meets a preset condition.

There are many ways to calculate a similarity. For example, a Hamming distance between hash values may be used to calculate similarities between the hash values. The hash values in the correspondence may be arranged in a descending sequence of similarities with the to-be-searched target. A preset number of hash values from top of the sequence are selected as hash values whose similarities with the to-be-searched target meets the preset condition. Facial information items corresponding to the selected hash values are used as facial information items corresponding to the to-be-searched target feature.

Alternatively, only a hash value with a highest similarity may be used as the hash value whose similarity with the to-be-searched target meets the preset condition. In another implementation, a hash value whose similarity with the to-be-searched target is greater than a preset threshold may be used as a hash value whose similarity with the to-be-searched target meets the a preset condition. Embodiments are not limited in this aspect.

In an implementation, after S101, the method may further include: determining an acquisition attribute of the to-be-recognized image as a to-be-searched acquisition attribute. The acquisition attribute includes a time and/or a location at which the to-be-recognized image is acquired.

S103 includes: searching, in the pre-established correspondence between target features and facial information items, for a target acquisition attribute whose difference from the to-be-searched acquisition attribute is less than a preset threshold; and searching, in facial information items corresponding to the target acquisition attribute, for a facial information item corresponding to the to-be-searched target feature.

In this embodiment, target features that are close to the moment and/or the location at which the to-be-recognized image are first searched for in the established correspondences, so as to reduce the search range. Further search is then made in the reduced search range.

It can be understood that if the search is made by calculating similarities between hash values, it is not necessary to calculate the similarity between the to-be-searched hash value and every hash value in the correspondence in this embodiment. Instead, a part of the hash values are excluded first based on an acquisition attribute. As such, only similarities between the to-be-searched hash value and remaining hash values are to be calculated. This reduces the calculation and further improves the search efficiency.

Moreover, the movement trajectory of the to-be-recognized human target is generally continuous, and images acquired at close moments and/or locations are more likely to include the same human target. Therefore, the application of this embodiment makes the search more accurate.

At S104, an identity of the to-be-recognized human target is determined based on the searched piece of facial information.

In one implementation manner, a correspondence between facial information items and identities may be pre-stored. Based on the correspondence, the identity corresponding to the facial information item searched in S103 is searched for.

The correspondences between the target features and the pieces of facial information, and the correspondences between the pieces of facial information and the identities may be stored in the same device or in different devices. The two types of correspondences may be stored in the executor of the embodiment of the present application, or may be found in other devices.

In one implementation, after S101 and before S104, the method may include: determining whether there is a facial region that meets a definition requirement in the to-be-recognized image; if there is a facial region that meets the definition requirement, extracting the facial information item from the to-be-recognized image; and if there is no facial region that meets the definition requirement, performing S104.

In this embodiment, if there is a facial region with a high definition in the to-be-recognized image, the facial region is directly extracted as a facial information item, and used for identity recognition. If there is no facial region with a high definition in the to-be-recognized image, the embodiment shown in FIG. 1 is used to recognize the identity.

A specific embodiment is described below.

It is assumed that, in the scenario shown in FIG. 2, a person X goes by an acquisition device A and an acquisition device E. The image of the person X acquired by the acquisition device A has a facial region of high definition, and the image of the person X acquired by the acquisition device E has a facial region of low definition. The acquisition device A sends the image of high definition to the server, and the server extracts and stores the target feature and the facial feature of the human target in the image.

It is further assumed that, an unclear image acquired by the acquisition device A is used as the to-be-recognized image, and a target feature of a to-be-recognized human target in the image is extracted as a to-be-searched target feature. A facial feature corresponding to the to-be-searched target feature is searched for in a correspondence stored by the server. It can be understood that, the to-be-searched target feature and the target feature stored in the server are both target features of the person X, and can successfully match with each other. Therefore, the facial feature stored in the server, that is, the facial feature of the person X is found.

It is further assumed that, a database stores the correspondence between facial features and identities, and the server searches for the identity corresponding to the facial feature of the person X in the database.

It can be seen that, in this solution, even if the facial region in the to-be-recognized image is not clear, a facial information item of the human body can still be determined through the pre-established correspondence between target features and facial information items, and the target feature of the human target in the to-be-recognized image. The identity of the human target can be then determined based on the facial information item.

Specifically, in a large-scale scenario under surveillance with panoramic details, the possibility for a single acquisition device to acquire a high-definition image of a front face of a target is low; however, the possibility for several acquisition devices in the same scenario to acquire a high-definition image of a front face of a target is high. In the embodiment of the present application, the correspondence between target features and facial information items is established based on the high-definition and front face-containing image. Then the identity of the human target in the to-be-recognized image is recognized by using the correspondence. This does not reduce the accuracy of identity recognition, even if the to-be-recognized image is not clear.

In the embodiment shown in FIG. 1 of the present application, a target feature of a to-be-recognized human target in the image is extracted as a to-be-searched target feature, a facial information item corresponding to the to-be-searched target feature is searched for based on a pre-established correspondence between target features and facial information items, and an identity of the to-be-recognized human target is determined based on the facial information as found. It can be seen that in this solution, there is no need to extract facial features in the image. Even if the facial region is not clear or is shaded by other objects in the image, the accuracy of identity identification will not be reduced. Therefore, the application of this solution improves the accuracy of recognizing the identity.

Corresponding to the above-described method embodiment, an embodiment of the present application also provides an apparatus for recognizing an identity of a human target.

Figure 3:
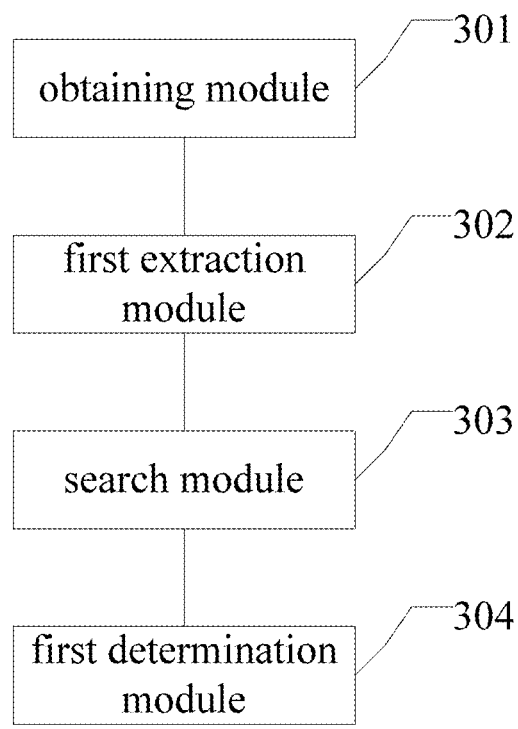
FIG. 3 is a schematic structural diagram of an apparatus for recognizing an identity of a human target provided by an embodiment of the present application.

FIG. 3 is a schematic structural diagram of an apparatus for recognizing an identity of a human target provided by an embodiment of the present application. The apparatus includes: an obtaining module 301 configured for obtaining a to-be-recognized image; a first extraction module 302 configured for extracting a target feature of a to-be-recognized human target in the to-be-recognized image as a to-be-searched target feature; a search module 303 configured for searching for a facial information item corresponding to the to-be-searched target feature based on a pre-established correspondence between target features and facial information items; wherein, in the correspondence, a pair of a target feature and a corresponding facial information item belongs to a same human target; and a first determination module 304 configured for determining an identity of the to-be-recognized human target based on the found facial information item.

In one implementation, the obtaining module 301 is further configured for receiving a to-be-recognized image input by a user; or, obtaining a to-be-recognized image from a designated acquisition device.

In one implementation, the search module 303 is further configured for searching for a facial feature corresponding to the to-be-searched target feature based on a pre-established correspondence between target features and facial features;

and the first determination module 304 is further configured for: determining the identity of the to-be-recognized human target based on the found facial feature.

In one implementation, the search module 303 is further configured for: searching for a facial image corresponding to the to-be-searched target feature based on a pre-established correspondence between target features and facial images; and the first determination module 304 is further configured for: determining the identity of the to-be-recognized human target based on the found facial image.

In one implementation, the first extraction module 302 is further configured for extracting an original target feature of the to-be-recognized human target in the to-be-recognized image, and calculating a hash value of the original target feature as a to-be-searched hash value; and the search module 303 is further configured for: searching for a facial information item corresponding to the to-be-searched hash value based on a pre-established correspondence between hash values and facial information items.

In one implementation, the search module 303 may be specifically configured for: calculating a similarity between each of the hash values included in the pre-established correspondence between hash values and facial information items and the to-be-searched hash value, respectively; and determining a facial information item corresponding to a hash value whose similarity with the to-be-searched hash value meets a preset condition.

In one implementation, the apparatus may further include: a second determination module (not shown in Figures) configured for determining an acquisition attribute of the to-be-recognized image as a to-be-searched acquisition attribute; wherein, the acquisition attribute includes a moment and/or a location at which the to-be-recognized image is acquired. The search module 303 may be further configured for: searching, in the pre-established correspondence between target features and facial information items, for a target acquisition attribute whose difference from the to-be-searched acquisition attribute is less than a preset threshold; and searching, in facial information items corresponding to the target acquisition attribute, for a facial information item corresponding to the to-be-searched target feature.

In one implementation, the apparatus may further include: a decision module and a second extraction module (not shown in Figures). The decision module may be configured for: determining whether there is a facial region that meets a definition requirement in the to-be-recognized image; if there is a facial region that meets the definition requirement, triggering a second extraction module; if there is no facial region that meets the definition requirement, triggering the first extraction module 302. The second extraction module is configured for extracting a facial information item in the to-be-recognized image.

Applying the embodiment shown in FIG. 3 of the present application, a target feature of a to-be-recognized human target in the image is extracted as a to-be-searched target feature, a facial information item corresponding to the to-be-searched target feature is searched for based on a pre-established correspondence between target features and facial information items, and an identity of the to-be-recognized human target is determined based on the facial information as found. It can be seen that in this solution, there is no need to extract facial features in the image. Even if the facial region is not clear or is shaded by other objects in the image, the accuracy of identity identification will not be reduced. Therefore, the application of this solution improves the accuracy of recognizing the identity.

Figure 4:
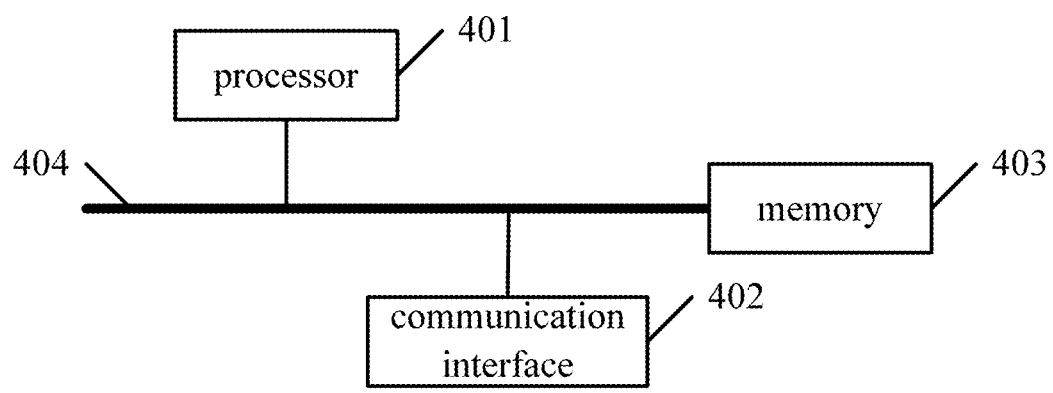
FIG. 4 is a schematic structural diagram of an electronic device provided by an embodiment of the present application.

An embodiment of the present application further provides an electronic device. As shown in FIG. 4, the electronic device includes a processor 401, a communication interface 402, a memory 403 and a communication bus 404; wherein, the processor 401, the communication interface 402 and the memory 403 communicate with each other via the communication bus 404; the memory 403 is configured for storing a computer program; the processor 401 is configured for executing the computer program stored in the memory 403 so as to perform operations of: obtaining a to-be-recognized image; extracting a target feature of a to-be-recognized human target in the to-be-recognized image as a to-be-searched target feature; searching for a facial information item corresponding to the to-be-searched target feature based on a pre-established correspondence between target features and facial information items; wherein, in the correspondence, a pair of a target feature and a corresponding facial information item belongs to a same human target; and determining an identity of the to-be-recognized human target based on the found facial information item.

In one implementation, obtaining a to-be-recognized image includes: receiving a to-be-recognized image input by a user; or, obtaining a to-be-recognized image from a designated acquisition device.

In one implementation, searching for a facial information item corresponding to the to-be-searched target feature based on a pre-established correspondence between target features and facial information items may include: searching for a facial feature corresponding to the to-be-searched target feature based on a pre-established correspondence between target features and facial features; determining an identity of the to-be-recognized human target based on the found facial information item may include determining the identity of the to-be-recognized human target based on the found facial feature.

In one implementation, searching for a facial information item corresponding to the to-be-searched target feature based on a pre-established correspondence between target features and facial information items may include: searching for a facial image corresponding to the to-be-searched target feature based on a pre-established correspondence between target features and facial images; determining an identity of the to-be-recognized human target based on the found facial information item may include: determining the identity of the to-be-recognized human target based on the found facial image.

In one implementation, extracting a target feature of a to-be-recognized human target in the to-be-recognized image as a to-be-searched target feature includes: extracting an original target feature of the to-be-recognized human target in the to-be-recognized image, and calculating a hash value of the original target feature as a to-be-searched hash value. Searching for a facial information item corresponding to the to-be-searched target feature based on a pre-established correspondence between target features and facial information items includes: searching for a facial information item corresponding to the to-be-searched hash value based on a pre-established correspondence between hash values and facial information items.

In one implementation, searching for a facial information item corresponding to the to-be-searched hash value based on a pre-established correspondence between hash values and facial information items includes: calculating a similarity between each of the hash values included in the pre-established correspondence between hash values and facial information items and the to-be-searched hash value, respectively; and determining a facial information item corresponding to a hash value whose similarity with the to-be-searched hash value meets a preset condition.

In one implementation, the processor 41 is further configured for performing operations of: after obtaining a to-be-recognized image, determining an acquisition attribute of the to-be-recognized image as a to-be-searched acquisition attribute; wherein, the acquisition attribute includes a moment and/or a location at which the to-be-recognized image is acquired. Searching for a facial information item corresponding to the to-be-searched target feature based on a pre-established correspondence between target features and facial information items includes: searching, in the pre-established correspondence between target features and facial information items, for a target acquisition attribute whose difference from the to-be-searched acquisition attribute is less than a preset threshold; and searching, in facial information items corresponding to the target acquisition attribute, for a facial information item corresponding to the to-be-searched target feature.

In one implementation, the processor 401 is further configured for performing operations of: after obtaining a to-be-recognized image, and before determining an identity of the to-be-recognized human target based on the found facial information item, determining whether there is a facial region that meets a definition requirement in the to-be-recognized image; if there is a facial region that meets the definition requirement, extracting the facial information item from the to-be-recognized image; if there is no facial region that meets the definition requirement, performing the operation of extracting a target feature of a to-be-recognized human target in the to-be-recognized image as a to-be-searched target feature.

The communication bus in the above electronic device can be a peripheral component interconnect (PCI) bus or an extended industry standard architecture (EISA) bus and the like. This communication bus may include an address bus, a data bus, a control bus, or the like. For ease of representation, only one thick line is shown in the figure, which does not represent that there is only one communication bus or one type of communication bus.

The communication interface is configured for communication between the above electronic advice and other advices.

The memory may include a random access memory (RAM), or may include a non-volatile memory (NVM), for example at least one disk memory. Optionally, the memory may further be at least a storage apparatus located away from the above processor.

The above processor may be a general-purpose processor, including a central processing unit (CPU), a network processor (NP), or the like; it may also be a digital signal processor (DSP), an application specific integrated circuit (ASIC), a field-programmable gate array (FPGA) or other programmable logic device, a discrete gate or transistor logic device, a discrete hardware component.

In the embodiment shown in FIG. 4 of the present application, a target feature of a to-be-recognized human target in the image is extracted as a to-be-searched target feature, a facial information item corresponding to the to-be-searched target feature is searched for based on a pre-established correspondence between target features and facial information items, and an identity of the to-be-recognized human target is determined based on the facial information as found. It can be seen that in this solution, there is no need to extract facial features in the image. Even if the facial region is not clear or is shaded by other objects in the image, the accuracy of identity identification will not be reduced. Therefore, the application of this solution improves the accuracy of recognizing the identity.

An embodiment of the present application provides a computer readable storage medium. The computer readable storage medium stores a computer program therein. The computer program, when executed by a processor, performs operations of: obtaining a to-be-recognized image; extracting a target feature of a to-be-recognized human target in the to-be-recognized image as a to-be-searched target feature; searching for a facial information item corresponding to the to-be-searched target feature based on a pre-established correspondence between target features and facial information items; wherein, in the correspondence, a pair of a target feature and a corresponding facial information item belongs to a same human target; and determining an identity of the to-be-recognized human target based on the found facial information item.

In one implementation, obtaining a to-be-recognized image includes: receiving a to-be-recognized image input by a user; or, obtaining a to-be-recognized image from a designated acquisition device.

In one implementation, searching for a facial information item corresponding to the to-be-searched target feature based on a pre-established correspondence between target features and facial information items may include: searching for a facial feature corresponding to the to-be-searched target feature based on a pre-established correspondence between target features and facial features; determining an identity of the to-be-recognized human target based on the found facial information item may include determining the identity of the to-be-recognized human target based on the found facial feature.

In one implementation, searching for a facial information item corresponding to the to-be-searched target feature based on a pre-established correspondence between target features and facial information items may include: searching for a facial image corresponding to the to-be-searched target feature based on a pre-established correspondence between target features and facial images; determining an identity of the to-be-recognized human target based on the found facial information item may include: determining the identity of the to-be-recognized human target based on the found facial image.

In one implementation, extracting a target feature of a to-be-recognized human target in the to-be-recognized image as a to-be-searched target feature includes: extracting an original target feature of the to-be-recognized human target in the to-be-recognized image, and calculating a hash value of the original target feature as a to-be-searched hash value. Searching for a facial information item corresponding to the to-be-searched target feature based on a pre-established correspondence between target features and facial information items includes: searching for a facial information item corresponding to the to-be-searched hash value based on a pre-established correspondence between hash values and facial information items.

In one implementation, searching for a facial information item corresponding to the to-be-searched hash value based on a pre-established correspondence between hash values and facial information items includes: calculating a similarity between each of the hash values included in the pre-established correspondence between hash values and facial information items and the to-be-searched hash value, respectively; and determining a facial information item corresponding to a hash value whose similarity with the to-be-searched hash value meets a preset condition.

In one implementation, the computer program, when executed by a processor, further performs operations of: after obtaining a to-be-recognized image, determining an acquisition attribute of the to-be-recognized image as a to-be-searched acquisition attribute; wherein, the acquisition attribute includes a moment and/or a location at which the to-be-recognized image is acquired. Searching for a facial information item corresponding to the to-be-searched target feature based on a pre-established correspondence between target features and facial information items includes: searching, in the pre-established correspondence between target features and facial information items, for a target acquisition attribute whose difference from the to-be-searched acquisition attribute is less than a preset threshold; and searching, in facial information items corresponding to the target acquisition attribute, for a facial information item corresponding to the to-be-searched target feature.

In one implementation, the computer program, when executed by a processor, further performs operations of: after obtaining a to-be-recognized image, and before determining an identity of the to-be-recognized human target based on the found facial information item, determining whether there is a facial region that meets a definition requirement in the to-be-recognized image; if there is a facial region that meets the definition requirement, extracting the facial information item from the to-be-recognized image; if there is no facial region that meets the definition requirement, performing the operation of extracting a target feature of a to-be-recognized human target in the to-be-recognized image as a to-be-searched target feature.

An embodiment of the present application further discloses an executable program code which, when executed, performs any method for recognizing an identity of a human target as described above.

It should be noted that the relationship terms used herein, such as "first", "second" and the like are only to distinguish one entity or operation from another entity or operation, but do not necessarily require or imply that there is an actual relationship or order between these entities or operations. Moreover, the terms "include", "include", or any other variants thereof are intended to cover a non-exclusive inclusion, such that processes, methods, articles or devices, including a series of elements, include not only those elements that have been listed, but also other elements that are not specifically listed or the elements intrinsic to these processes, methods, articles or devices. Without further limitations, elements limited by the wording "include(s) a/an . . . " or "include(s) a/an . . . " do not exclude additional identical elements in the processes, methods, articles or devices, including the listed elements.

All of the embodiments in the description are described in a correlated manner, and identical or similar parts in various embodiments can refer to one another. In addition, the description for each embodiment focuses on the differences from other embodiments. In particular, the embodiment of the apparatus shown in FIG. 3, the embodiment of the electronic device shown in FIG. 4, the above embodiment of the computer readable storage medium and the above embodiment of the executable program code are described briefly, since they are basically similar to the embodiments of the method shown in FIGS. 1-2. And the related contents can be known with reference to the description of the embodiments of the method shown in FIGS. 1-2.

The above described embodiments are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A method for recognizing an identity of a human target, comprising:
obtaining a to-be-recognized image acquired by an image acquisition device in communication with a server;
determining whether there is a facial region that meets a definition requirement in the to-be-recognized image;
if there is no facial region that meets the definition requirement, extracting a target feature of a to-be-recognized human target in the to-be-recognized image as a to-be-searched target feature;
searching for a facial information item corresponding to the to-be-searched target feature based on a pre-established correspondence between target features and facial information items; wherein, in the correspondence, a pair of a target feature and a corresponding facial information item belongs to a same human target; wherein target features in the correspondence and the corresponding facial information items are extracted from images meeting the definition requirement and comprising a clear human body region and a clear facial region; and wherein, the images comprises a front face of the same human target and are captured by another acquisition device in communication with the same server; and
determining an identity of the to-be-recognized human target based on the found facial information item.

2. The method of claim 1, wherein, obtaining a to-be-recognized image comprises:
receiving a to-be-recognized image input by a user; or
obtaining a to-be-recognized image from a designated acquisition device.

3. The method of claim 1, wherein, searching for a facial information item corresponding to the to-be-searched target feature based on a pre-established correspondence between target features and facial information items comprises:
searching for a facial feature corresponding to the to-be-searched target feature based on a pre-established correspondence between target features and facial features;
determining an identity of the to-be-recognized human target based on the found facial information item comprises:
determining the identity of the to-be-recognized human target based on the found facial feature.

4. The method of claim 1, wherein, searching for a facial information item corresponding to the to-be-searched target feature based on a pre-established correspondence between target features and facial information items comprises:
searching for a facial image corresponding to the to-be-searched target feature based on a pre-established correspondence between target features and facial images;
determining an identity of the to-be-recognized human target based on the found facial information item comprises:
determining the identity of the to-be-recognized human target based on the found facial image.

5. The method of claim 1, wherein, extracting a target feature of a to-be-recognized human target in the to-be-recognized image as a to-be-searched target feature comprises:
extracting an original target feature of the to-be-recognized human target in the to-be-recognized image, and calculating a hash value of the original target feature as a to-be-searched hash value;

searching for a facial information item corresponding to the to-be-searched target feature based on a pre-established correspondence between target features and facial information items comprises:

searching for a facial information item corresponding to the to-be-searched hash value based on a pre-established correspondence between hash values and facial information items.

6. The method of claim 5, wherein, searching for a facial information item corresponding to the to-be-searched hash value based on a pre-established correspondence between hash values and facial information items comprises:

calculating a similarity between each of the hash values included in the pre-established correspondence between hash values and facial information items and the to-be-searched hash value, respectively; and determining a facial information item corresponding to a hash value whose similarity with the to-be-searched hash value meets a preset condition.

7. The method of claim 1, wherein, after obtaining a to-be-recognized image, the method further comprises:

determining an acquisition attribute of the to-be-recognized image as a to-be-searched acquisition attribute; wherein, the acquisition attribute includes a moment and/or a location at which the to-be-recognized image is acquired;

searching for a facial information item corresponding to the to-be-searched target feature based on a pre-established correspondence between target features and facial information items comprises:

searching, in the pre-established correspondence between target features and facial information items, for a target acquisition attribute whose difference from the to-be-searched acquisition attribute is less than a preset threshold; and searching, in facial information items corresponding to the target acquisition attribute, for a facial information item corresponding to the to-be-searched target feature.

8. An electronic device, comprising a processor, a communication interface, a memory and a communication bus; wherein, the processor, the communication interface and the memory communicate with each other via the communication bus; the memory is configured for storing a computer program; the processor is configured for executing the computer program stored in the memory so as to perform operations of:

obtaining a to-be-recognized image acquired by an image acquisition device in communication with a server;

determining whether there is a facial region that meets a definition requirement in the to-be-recognized image;

if there is no facial region that meets the definition requirement, extracting a target feature of a to-be-recognized human target in the to-be-recognized image as a to-be-searched target feature;

searching for a facial information item corresponding to the to-be-searched target feature based on a pre-established correspondence between target features and facial information items; wherein, in the correspondence, a pair of a target feature and a corresponding facial information item belongs to a same human target; wherein target features in the correspondence and the corresponding facial information items are extracted from images meeting the definition requirement and comprising a clear human body region and a clear facial region; and wherein, the images comprises a front face of the same human target and are captured by another acquisition device in communication with the same server; and determining an identity of the to-be-recognized human target based on the found facial information item.

9. The electronic device of claim 8, wherein, obtaining a to-be-recognized image comprises:

receiving a to-be-recognized image input by a user;

or, obtaining a to-be-recognized image from a designated acquisition device.

10. The electronic device of claim 8, wherein, searching for a facial information item corresponding to the to-be-searched target feature based on a pre-established correspondence between target features and facial information items comprises:

searching for a facial feature corresponding to the to-be-searched target feature based on a pre-established correspondence between target features and facial features;

determining an identity of the to-be-recognized human target based on the found facial information item comprises:

determining the identity of the to-be-recognized human target based on the found facial feature.

11. The electronic device of claim 8, wherein, searching for a facial information item corresponding to the to-be-searched target feature based on a pre-established correspondence between target features and facial information items comprises:

searching for a facial image corresponding to the to-be-searched target feature based on a pre-established correspondence between target features and facial images;

determining an identity of the to-be-recognized human target based on the found facial information item comprises:

determining the identity of the to-be-recognized human target based on the found facial image.

12. The electronic device of claim 8, wherein, extracting a target feature of a to-be-recognized human target in the to-be-recognized image as a to-be-searched target feature comprises:

extracting an original target feature of the to-be-recognized human target in the to-be-recognized image, and calculating a hash value of the original target feature as a to-be-searched hash value;

searching for a facial information item corresponding to the to-be-searched target feature based on a pre-established correspondence between target features and facial information items comprises:

searching for a facial information item corresponding to the to-be-searched hash value based on a pre-established correspondence between hash values and facial information items.

13. The electronic device of claim 12, wherein, searching for a facial information item corresponding to the to-be-searched hash value based on a pre-established correspondence between hash values and facial information items comprises:

calculating a similarity between each of the hash values included in the pre-established correspondence between hash values and facial information items and the to-be-searched hash value, respectively; and determining a facial information item corresponding to a hash value whose similarity with the to-be-searched hash value meets a preset condition.

14. The electronic device of claim 8, wherein, the processor is further configured for performing operations of:

after obtaining a to-be-recognized image, determining an acquisition attribute of the to-be-recognized image as a to-be-searched acquisition attribute; wherein, the acquisition attribute includes a moment and/or a location at which the to-be-recognized image is acquired;

searching for a facial information item corresponding to the to-be-searched target feature based on a pre-established correspondence between target features and facial information items comprises:

searching, in the pre-established correspondence between target features and facial information items, for a target acquisition attribute whose difference from the to-be-searched acquisition attribute is less than a preset threshold; and searching, in facial information items corresponding to the target acquisition attribute, for a facial information item corresponding to the to-be-searched target feature.

* * * * *